(12) United States Patent
Lu et al.

(10) Patent No.: US 9,046,216 B2
(45) Date of Patent: Jun. 2, 2015

(54) MONITOR STAND

(71) Applicant: SYNCMOLD ENTERPRISE CORP., New Taipei (TW)

(72) Inventors: Der-Wei Lu, New Taipei (TW); Chung-Cheng Hu, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 0 days.

(21) Appl. No.: 14/297,831

(22) Filed: Jun. 6, 2014

(65) Prior Publication Data
US 2014/0284435 A1 Sep. 25, 2014

Related U.S. Application Data

(63) Continuation-in-part of application No. 13/242,796, filed on Sep. 23, 2011, now abandoned.

(51) Int. Cl.
*F16M 11/04* (2006.01)
*F16M 11/10* (2006.01)
*F16M 11/24* (2006.01)
*F16M 11/28* (2006.01)

(52) U.S. Cl.
CPC ............... *F16M 11/10* (2013.01); *F16M 11/04* (2013.01); *F16M 11/24* (2013.01); *F16M 11/28* (2013.01); *F16M 2200/027* (2013.01)

(58) Field of Classification Search
CPC ..... F16M 11/04; F16M 11/10; F16M 11/046; F16M 11/24; F16M 2200/048; F16M 11/28; Y10S 248/917; Y10S 248/919; Y10S 248/92

USPC ............ 248/157, 161, 295.11, 412, 414, 420; 361/679.01, 679.21, 679.22

See application file for complete search history.

(56) References Cited

U.S. PATENT DOCUMENTS

| 4,304,380 | A  | * | 12/1981 | Clusener ........................ 248/662 |
| 4,708,309 | A  | * | 11/1987 | Walter ........................ 248/218.4 |
| 6,796,537 | B1 | * | 9/2004  | Lin ............................ 248/162.1 |
| 6,994,306 | B1 | * | 2/2006  | Sweere et al. ............. 248/295.11 |
| 6,997,422 | B2 | * | 2/2006  | Sweere et al. ............. 248/123.11 |
| 7,226,024 | B2 | * | 6/2007  | Lin ............................ 248/125.8 |
| 7,413,150 | B1 | * | 8/2008  | Hsu ........................... 248/123.11 |
| 7,591,443 | B2 | * | 9/2009  | Lee et al. ....................... 248/158 |
| 7,694,920 | B2 | * | 4/2010  | Lien et al. ................... 248/125.8 |
| 7,780,125 | B2 | * | 8/2010  | Yen et al. .................... 248/125.1 |
| 8,056,877 | B2 | * | 11/2011 | Wang et al. ..................... 248/414 |
| 8,313,074 | B2 | * | 11/2012 | Wang ........................ 248/295.11 |
| 8,411,425 | B2 | * | 4/2013  | Tu et al. ..................... 361/679.21 |

(Continued)

*Primary Examiner* — Terrell McKinnon
*Assistant Examiner* — Eret McNichols
(74) *Attorney, Agent, or Firm* — Rosenberg, Klein & Lee

(57) ABSTRACT

A monitor stand for supporting a screen unit is provided. The monitor comprises a supporting unit, a mounting unit, at least one contact wall and at least one brake unit. The brake unit includes a resisting block capable of moving between a first position and a second position. A lower frictional threshold force is generated between the resisting block and the contact wall if the resisting block is at the first position; an upper frictional threshold force is generated between the resisting block and the contact wall if the resisting block is at the second position. The mounting unit moves against the supporting unit and toward a first direction or a second direction, and the resisting block is at the first position if the mounting unit moves toward the first direction, and the resisting block is at the second position if the mounting unit moves toward the second direction.

5 Claims, 10 Drawing Sheets

(56) References Cited

U.S. PATENT DOCUMENTS

| | | | | |
|---|---|---|---|---|
| 2003/0234332 A1* | 12/2003 | Yen et al. | | 248/404 |
| 2004/0084585 A1* | 5/2004 | Watanabe et al. | | 248/276.1 |
| 2004/0118984 A1* | 6/2004 | Kim et al. | | 248/149 |
| 2005/0205725 A1* | 9/2005 | Yokouchi et al. | | 248/125.1 |
| 2007/0205345 A1* | 9/2007 | Chen | | 248/297.31 |
| 2007/0247795 A1* | 10/2007 | Tseng | | 361/681 |
| 2007/0278362 A1* | 12/2007 | Lee | | 248/133 |
| 2007/0278364 A1* | 12/2007 | Jang | | 248/161 |
| 2008/0237414 A1* | 10/2008 | Lien et al. | | 248/125.2 |
| 2009/0039211 A1* | 2/2009 | Hsu | | 248/157 |
| 2009/0179133 A1* | 7/2009 | Gan et al. | | 248/422 |
| 2010/0006725 A1* | 1/2010 | Kim et al. | | 248/222.51 |
| 2010/0059647 A1* | 3/2010 | Hu | | 248/346.06 |
| 2010/0155559 A1* | 6/2010 | Liu | | 248/295.11 |
| 2010/0187374 A1* | 7/2010 | Hu | | 248/157 |
| 2010/0308197 A1* | 12/2010 | Bishop | | 248/414 |

* cited by examiner

MONITOR STAND

CROSS-REFERENCE TO RELATED APPLICATION

This U.S. Non-provisional Application for Patent is a continuation-in-part application of patent application Ser. No. 13/242,796 filed on Sep. 23, 2011 and entitled "MONITOR STAND", now pending. The entirety of each of the above-mentioned patent applications is hereby incorporated by reference herein and made as a part of this specification.

BACKGROUND OF THE INVENTION

1. Field of the Invention

The present invention relates to a stand, particularly to a monitor stand capable of braking.

2. Description of Related Art

Conventionally, the monitor, computer screen, TV, LCD monitor, flat panel display, or some other electrical appliances, may be supported on the desk by means of a stand, in which the stand plays the role of securing the supported device and bearing its weight. Generally, there is a very wide range of design options for the stand. Sometimes, the stand may contain some kinds of elastic components or spring, so as to raise the screen or lift up the lumping weight of the electrical appliances; namely, the elastic component or spring may generate a specific force upward to overcome the downward gravitational force. However, sometimes the electrical appliance could be rapidly raised and someone might be injured due to the rebound force accidentally.

Thus, the ability to regulate the height of the electrical appliance without being injured by the rebound force of the elastic component or spring is a critical issue that needs to be settled.

SUMMARY OF THE INVENTION

The primary objective of the present invention is to regulate the height of the screen unit arbitrarily and to stop the screen unit anytime and anywhere, and furthermore, to achieve different braking forces directionally.

To achieve the foregoing and the other objectives, a monitor stand for supporting a screen unit is provided. The monitor stand comprises a supporting unit, a mounting unit, at least one contact wall, and at least one brake unit. The mounting unit connects with the screen unit and moves against the supporting unit; the contact wall is fixed to either the supporting unit or the mounting unit; the brake unit is contacted with the contact wall and correspondingly disposed between the mounting unit and the supporting unit; the brake unit includes a resisting block that traverses between a first position and a second position. A lower threshold force is generated between the resisting block and the contact wall if the resisting block is at the first position; and an upper threshold force is generated between the resisting block and the contact wall if the resisting block is at the second position. The mounting unit can move against the supporting unit towards a first direction or a second direction. The resisting block is at the first position when the mounting unit moves toward the first direction, and the resisting block is at the second position when the mounting unit moves toward the second direction.

According to one embodiment of the monitor stand, the deformation of the resisting block at the second position is greater than the deformation at the first position.

Also, the first direction is opposite to the second direction; the contact wall is parallel to the first direction; the brake unit further includes a bracket firmly disposed on the mounting unit; a pair of slanting surfaces are arranged on one side of each bracket, where the slanting surfaces are sloped with respected to the contact wall; the resisting block moves along the slanting surface touchingly between the first position and the second position.

Additionally, the brake unit further includes a thru-slot passing through the bracket and a pad disposed at one end of the thru-slot; the slanting surface is adjacent to another end of the thru-slot; the pad and the resisting block are fastened together.

Furthermore, the resisting block further includes a cap covering the side portion thereof. At least one threaded thru-hole is formed on the side portion of the cap. A screw can be driven into the thru-hole to fasten the cap with the pad.

Preferably, the thru-slot further has a guiding plane at the interior thereof, and the guiding plane is longer than the pad along the first direction; one side of the pad moves along the guiding plane.

In another embodiment, the brake unit further includes a bracket pivotally disposed on the mounting unit; the resisting block is disposed on the bracket, and the contact wall is disposed on the supporting unit. The resisting block touches the contact wall by a contact area, and the contact area at the first position is smaller than the contact area at the second position.

Alternatively, the bracket is pivotally disposed on the supporting unit; the resisting block is disposed on the bracket, and the contact wall is correspondingly disposed on the mounting unit.

Furthermore, the brake unit further includes a stopper pivotally disposed on the mounting unit, and the stopper touches the resisting block when the resisting block is at the first position.

For advantages, the monitor stand of present invention may generate frictional force between the resisting block and the contact wall, so as to retain the screen unit at desirable height. Additionally, the monitor stand has no elastic component or spring, which eliminates the occurrence of rebounding force that may accidentally injure the user. Besides, by means of shifting the resisting block between the first position and the second position, a lower threshold force and an upper threshold force are generated, respectively.

The foregoing, as well as additional objects, features and advantages of the invention will be more readily apparent from the following detailed descriptions, which proceed with reference to the accompanying drawings.

DETAILED DESCRIPTION OF PREFERRED EMBODIMENT

Figure 1A:
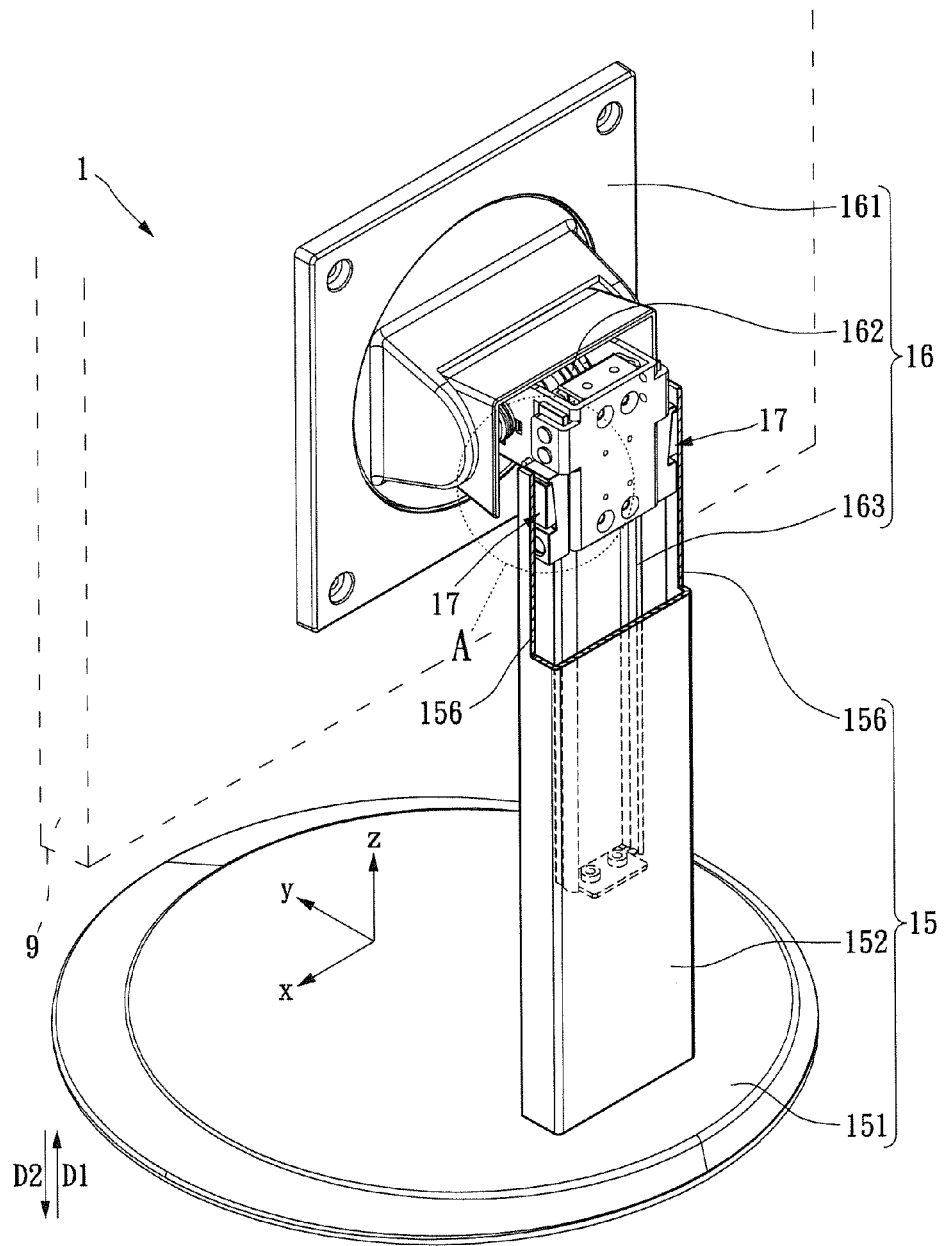
FIG. 1A is a perspective view of a monitor stand of a first embodiment of the present invention.
Figure 1B:
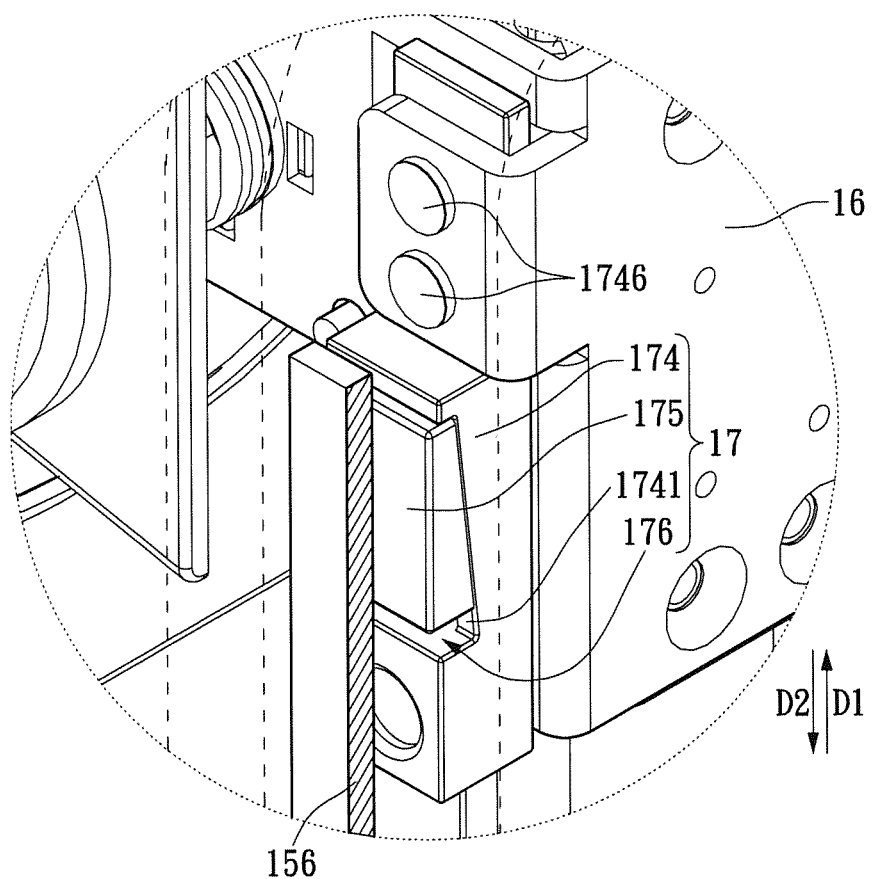
FIG. 1B is an enlarged view of section A in FIG. 1A.

Please refer to FIGS. 1A and 1B. FIG. 1A is a perspective view of a monitor stand for a first embodiment of the present invention. FIG. 1B is an enlarged view of section A in FIG. 1A. As shown in FIGS. 1A and 1B, a monitor stand 1 utilized for supporting a screen unit 9 comprises a supporting unit 15, a mounting unit 16, and a pair of brake units 17. The supporting unit 15 includes a base 151, a pedestal 152, and a pair of contact walls 156. The pedestal 152 has an inner space (unmarked) formed therein and connects to the top surface of the base 151. The contact walls 156 are disposed at inner face of the pedestal 152. The mounting unit 16 includes a holder 161, a rotatable shaft 162, and a guide rail 163. The holder 161 is for connecting to the screen unit 9 and connected to the shaft 162. In this manner, the holder 161 and the screen unit 9 can be rotated. The shaft 162 is slidably connected to the guide rail 163, thus enabling the shaft 162 to move longitudinally along the pedestal 152. In other words, the screen unit 9 may be moved upward or downward. The pedestal 152 accommodates the guide rail 163 and the brake units 17, to prevent the mounting unit 16 and the brake units 17 from swaying while moving upward or downward. In this embodiment, the guide rail 163 of the mounting unit 16 is held in place by the contact walls 156, so that the holder 161 and the shaft 162 may move along the contact walls 156 (i.e. along the z-axis). Besides, the contact walls 156, the pedestal 152, and the base 151 can be formed in one piece. To better address the technical features of inside the pedestal 152, different sectional views of the pedestal 152 are illustrated for convenience.

For the instant embodiment, the upward direction is defined as the first direction D1 and the downward direction is defined as the second D2 direction. Hence, the first direction D1 and the second direction D2 are opposite to each other. The screen unit 9 may be thus being moved toward the first direction D1 or the second direction D2. The brake units 17 are disposed between the contact walls 156 and the guide rail 163 of the mounting unit 16; and the brake units 17 are slidably arranged on the guide rail 163 of the mounting unit 16.

Figure 2A:
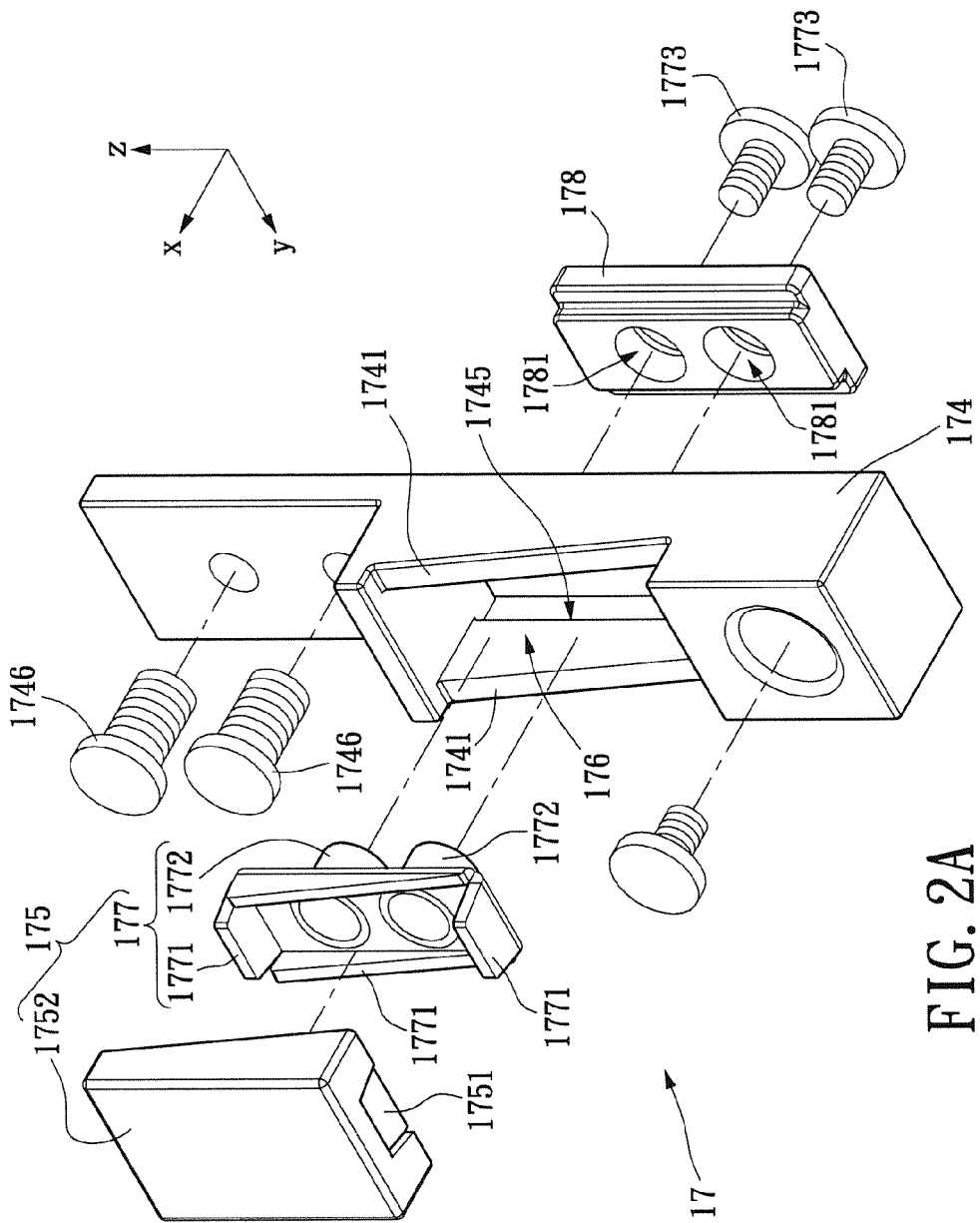
FIG. 2A is an exploded view of a brake unit of the first embodiment of the present invention.
Figure 2B:
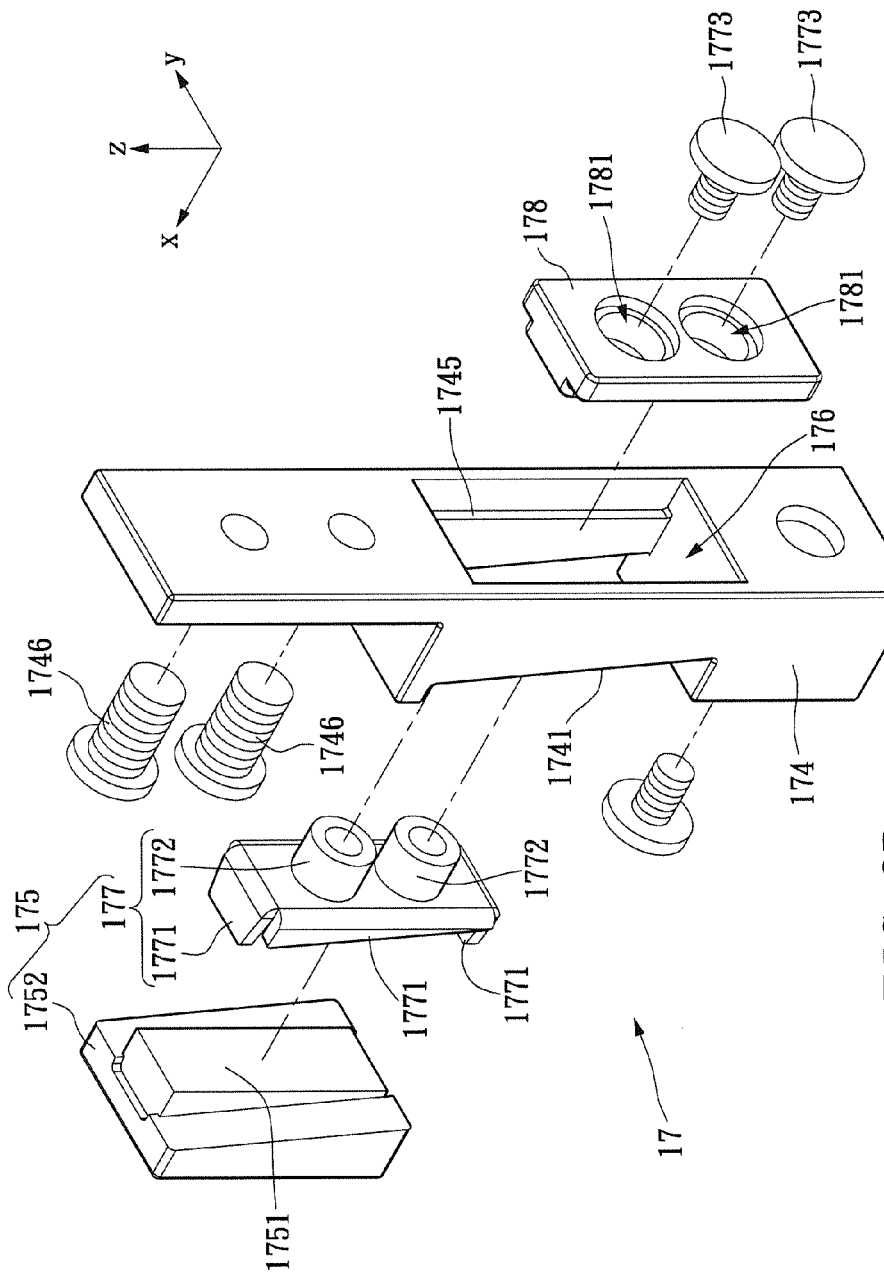
FIG. 2B is another exploded view of the brake unit of the first embodiment of the present invention.

Please simultaneously refer to FIGS. 2A and 2B. FIG. 2A is an exploded view of the brake unit 17 of the first embodiment of the present invention. FIG. 2B is another exploded view of the brake unit 17 of the first embodiment of the present invention. For convenience, the directional reference mentioned hereinafter for the brake unit 17 is based on FIG. 2A. In this embodiment, the brake unit 17 includes a bracket 174, a resisting block 175, and a locking pad 178.

The bracket 174 has a thru-slot 176 formed thereon, a pair of slanting surfaces 1741 formed on the left edge portions of the thru-slot 176, and a pair of guiding planes 1745 formed opposingly on the wall members that define the thru-slot 176. The slanting surfaces 1741 are sloped with respect to the moving direction of the mounting unit 16. As shown in FIGS. 2A and 2B, each of the slanting surfaces 1741 is substantially U-shaped by extending from upper left toward lower right, with the opposite end portions thereof bending leftward. In other words, each of the slanting surfaces 1741 crosses the z-axis with an imaginary angle (unmarked) formed therebetween. The thru-slot 176 extends along the traversing path (z-axis) of the mounting unit 16 and projects. As shown in FIGS. 1A and 1B, the bracket 174 is disposed on the mounting unit 16; in this manner, the bracket 174 may be dragged upward or downward when the mounting unit 16 moves with the screen unit 9.

The resisting block 175 is disposed adjacently to the left side portion of the thru-slot 176 and abutting to the slanting surfaces 1741. The resisting block 175 includes a cap 177 and a main body 1752. The main body 1752 may be made of rubber or soft plastic material. The cap 177 has four clamps 1771 that clip to a ridge 1751 formed on one side of the main body 1752, so that the cap 177 may cover one side portion of the main body 1752 and secured firmly thereto to prevent disengagement. Furthermore, the cap 177 has two tapped holes 1772 formed on the right side portion thereof, which are discussed hereinbelow.

Figure 3B:
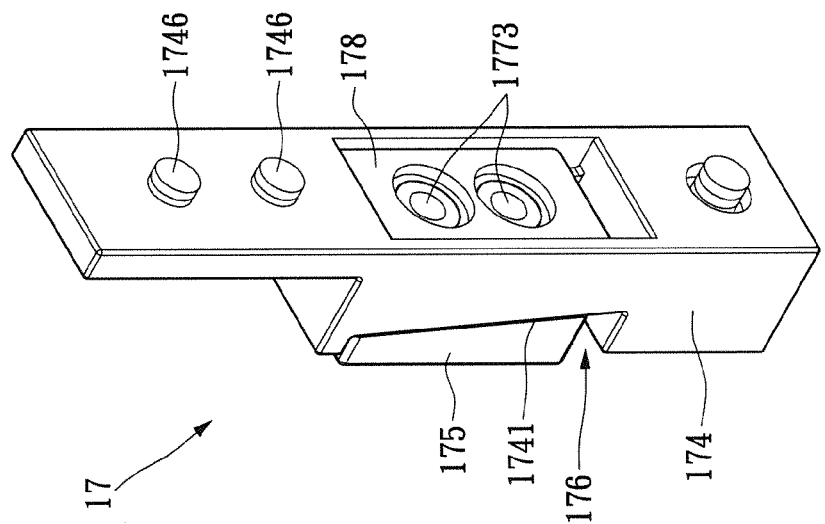
FIG. 3B is another assembled view of the brake unit of the first embodiment of the present invention.
Figure 3A:
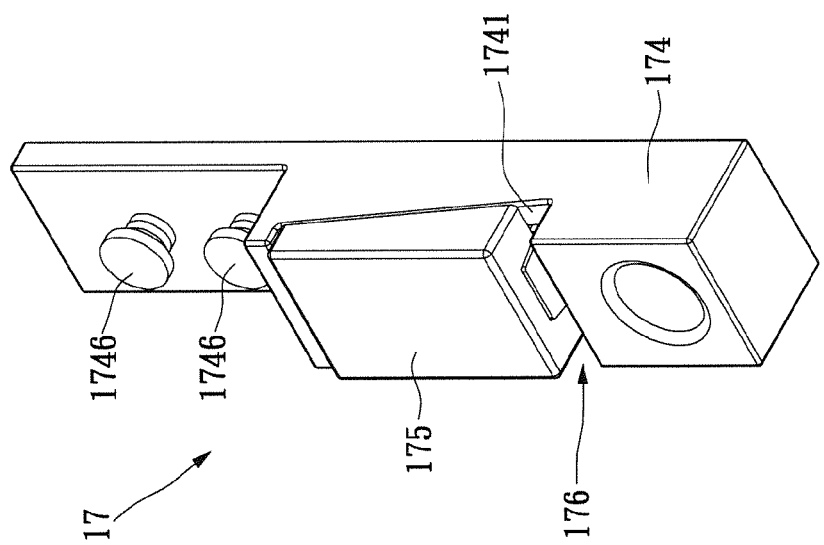
FIG. 3A is an assembled view of the brake unit of the first embodiment of the present invention.

The locking pad 178 is disposed adjacently on the right edge portion of the thru-slot 176. The locking pad 178 also has two locking holes 1781 projected therethrough. Two screws 1773 are used to penetrate through the locking holes 1781 and driven into the tapped holes 1772, so as to firmly secure the locking pad 178 with the resisting block 175. In this manner, the slanting surfaces 1741 and the guiding planes 1745 serve to restrict the resisting block 175 and the locking pad 178 at designated positions, so the brake unit 17 can be assembled without fumbling different pieces. Moreover, each of the guiding planes 1745 is longer than the locking pad 178 along the first direction D1; and the resisting block 175 and the locking pad 178 are both shorter than the thru-slot 176 along the z-axis. Therefore, the resisting block 175 and the locking pad 178 may be move slightly upward or downward along the slanting surfaces 1741 and the guiding planes 1745, respectively. As shown in FIGS. 3A and 3B, the resisting block 175 and the locking pad 178 can be moved between the first position (i.e. lowest position) and the second position (i.e. highest position).

Next, further explanation is given herein regarding the first position and the second position. Please refer to FIG. 3C, which shows the brake unit 17 arranged at the second position. At this instant, the topmost surface of the main body 1752 of the resisting block 175 touches the upper end portions of the slanting surfaces 1741, while the left side portion and the right side portion of the main body 1752 touches the contact wall 156 and the slanting surfaces 1741, respectively. Since each of the slanting surfaces 1741 is substantially sloped from the upper left toward lower right, while each of the contact walls 156 runs parallel to the z-axis, the distance between each of the slanting surfaces 1741 and the corresponding contact wall 156 gradually decreases in the upward direction. In other words, the clearance defined between each of the slanting surfaces 1741 and the corresponding contact wall 156 becomes progressively smaller toward the upward direction. Therefore, the resisting block 175 is squeezed and compressed at the second position. The deformed resisting block exerts frictional force against the contact wall 156.

Figure 3D:
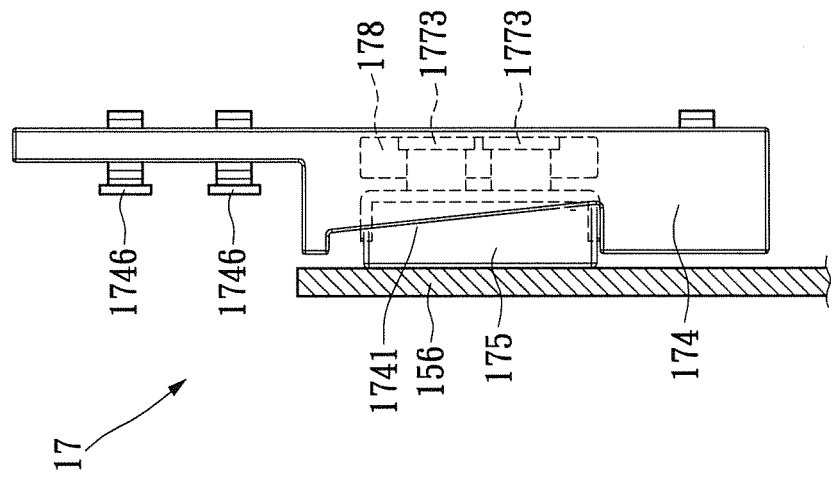
FIG. 3D is a side view of the brake unit when the mounting unit is moving upward.
Figure 3C:
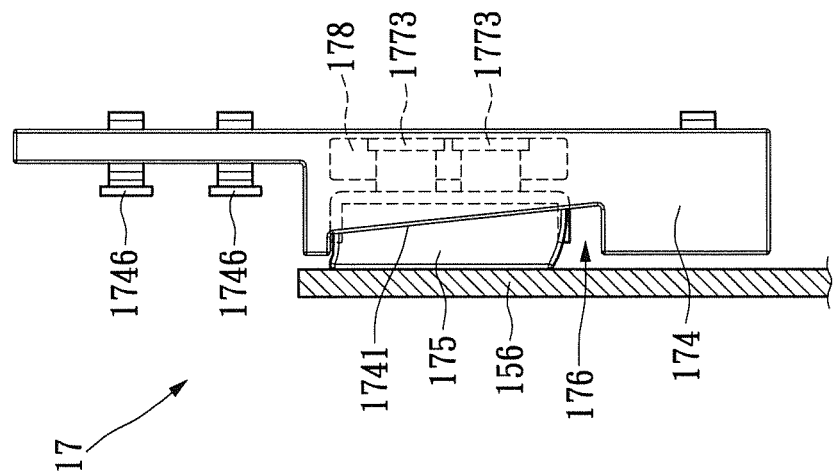
FIG. 3C is a side view of the brake unit when the mounting unit is moving downward.

Next, please refer to FIG. 3D, which shows the brake unit 17 arranged at the first position. At this configuration, the undermost surface of the main body 1752 touches the lower end portions of the slanting surfaces 1741, while the left side portion and the right side portion of the main body 1752 still touches the contact wall 156 and the slanting surfaces 1741, respectively. Since the clearance defined between the slanting surfaces 1741 and the contact wall 156 is greater at the first position, the main body 1752 of the resisting block 175 undergoes less deformation than at the second position. However, the resisting block 175 still exerts a frictional force against the contact wall 156.

The aforementioned deformation could involve horizontal and/or vertical compression, with the major compression being in the horizontal direction. Please note, the accompanying figures only show the compression of the resisting block 175 in the vertical direction (as in FIG. 3C).

Because the main body 1752 of the resisting block 175 may undergo different degrees of deformation at different positions, the effective/actual contact area thereof against the contact wall 156 may also vary. Accordingly, the friction coefficient between the resisting block 175 and the contact wall 156 would vary, thereby the frictional force there-between is also variable. Therefore, when adjusting the vertical position of the screen unit 9, the applied force required to overcome the total frictional force would vary by position. Generally speaking, less applied force is required when moving the screen unit 9 from the first position toward the second position. In other words, the brake unit 17 generates a lower frictional threshold force between the resisting block 175 and the contact wall 156. Whereas greater applied force is necessary when moving the screen unit 9 from the second position toward the first position, with the brake unit 17 generates an upper frictional threshold force between the resisting block 175 and the contact wall 156.

The performance impact of the brake unit 17 is next addressed herein. When the screen unit 9 is idle, the resisting block 175 is generally arranged at the second position (i.e. highest position). The main body 1752 of the resisting block 175 generates a frictional force against the contact wall 156 to counter the supported weight of the screen unit 9 in reaching an equilibrium. In this embodiment, the supported weight comprises the weight of the screen unit 9, part of the mounting unit 1, and the brake unit 17. Therefore, the screen unit 9 may be arbitrarily stopped at any pre-determined position along the guide rail 163. Specifically, the present invention may adapt to all kinds of screen unit 9 (which have distinct weight) by inducing different frictional forces from the main body 1752 of the resisting block 175 to counter the supported weight. Hence, the monitor stand 1 of the present invention is an universal type monitor stand applicable to any screen unit 9.

When the screen unit 9 is being pulled downward (i.e. in the second direction D2), the main body 1752 will initially remain idle as the friction between the main body 1752 and the contact wall 156 increases. When the applied force becomes greater than the upper frictional threshold force, which is the maximum friction between the main body 1752 and the contact wall 156, only then would the screen unit 9 actually begin to move toward the second direction.

To be descriptive, if the weight of the mounting unit 1 and the brake unit 17 are neglected, then the upper frictional threshold force is essentially governed by the theoretical maximum allowable weight of the screen unit 9. If this upper frictional threshold force is exceeded, the screen unit 9 would fall down on its own due to gravity without any other applied force.

On the contrary, when the screen unit 9 is being moved upward (i.e. in the first direction D1), the mounting unit 16 and the bracket 174 are correspondingly moved upward, such that right side portion of the main body 1752 is no longer under the effect of downward force exerted by the slanting surfaces 1741. Meanwhile, the left side portion of the main body 1752 remains in contact against the contact wall 156 and a frictional force still exists there-between. Therefore, initially the main body 1752 would remain idle with respect to the contact wall 156. Only after the main body 1752 has gone from the second position (uppermost position) to the first position (lowermost position) without actual displacement with respect to the contact wall 156, where the bottommost portion of the main body 1752 abuts to the lower end portion of the slanting surfaces 1741, the main body 1752 would actually be shift upward by the bracket 174. During the abovementioned shift regarding the orientation of the main body 1752 from the second position (highest position) to the first position (lowest position), the deformation of the main body 1752 gradually lessens. Correspondingly, the upper frictional threshold force originally generated by the brake unit 17 gradually becomes the lower frictional threshold force. Moreover, during the abovementioned adjustment process of the screen unit 9, the idling time of the main body 1752 with respect to the contact wall 156 is extremely short. Therefore, to move the screen unit 9 upward, the force that needs to be overcame is the lower frictional threshold force.

It's obvious that the lower frictional threshold force is less than the upper frictional threshold force. Therefore, the frictional threshold force needed to overcome is less for moving the screen unit 9 upward than downward. When the frictional threshold force is far greater than the weight of the screen unit 9 or when the weight of the screen unit 9 is neglected (e.g. without the screen unit 9), the required force to move the mounting unit 16 upward is less than downward. In other words, the braking force of the monitor stand 1 of the present invention is direction-dependent.

Besides, those skilled in the art may further adjust the angle of the slanting surface 1741, or reverse the brake unit 17 in an up-side-down orientation. Thereby, the lower frictional threshold force is thus generated when the resisting block 175 is at the highest position and the upper frictional threshold force is generated when the resisting block 175 is at the lowest position.

By means of the aforementioned technical features, the vertical position of the screen unit 9 may be arbitrarily adjusted. Also, by eliminating the elastic components or springs for the present invention, no sudden rebounding force would occur. Thus, the risk of injury to the user due to the sudden rebounding force is eliminated.

Figure 4:
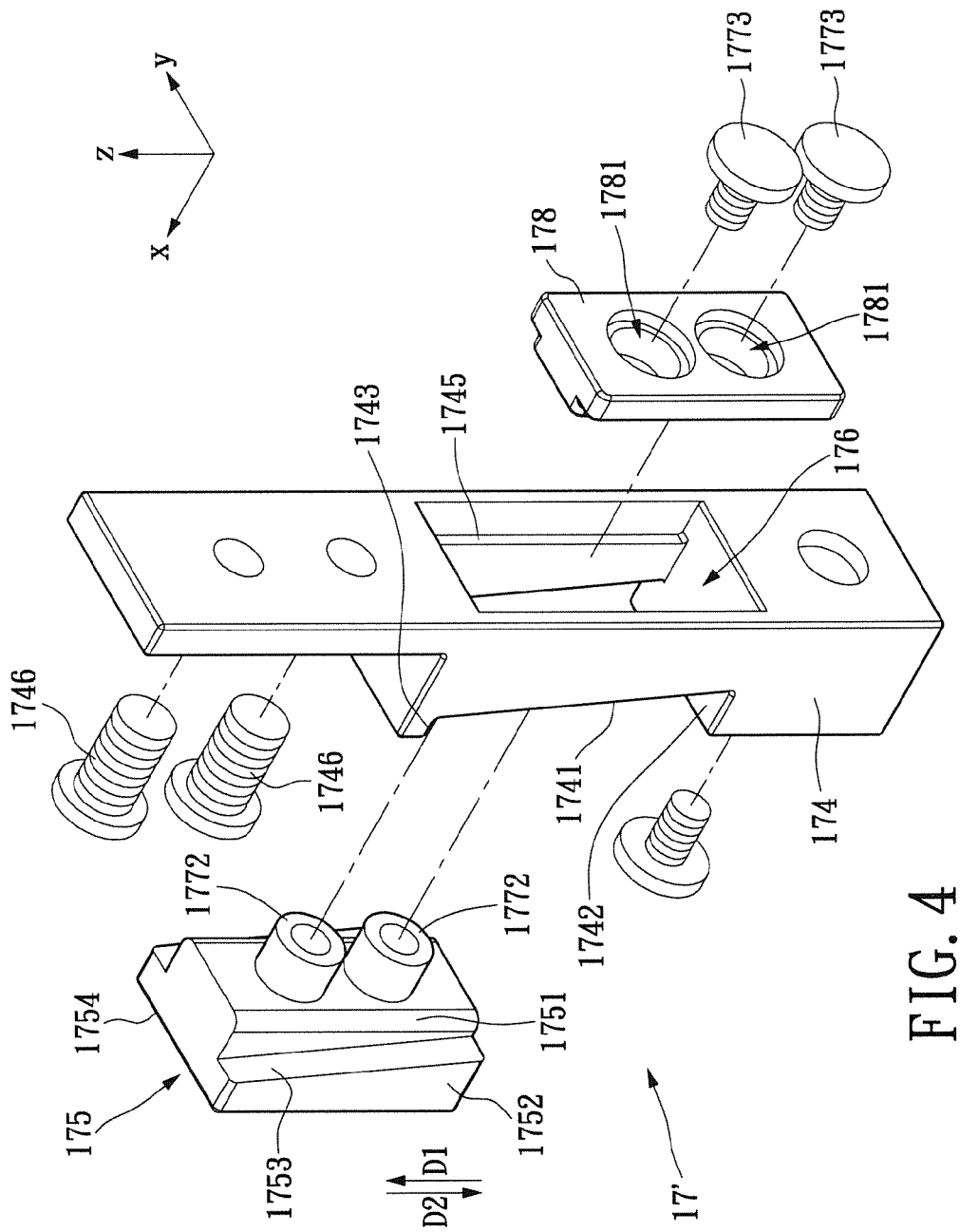
FIG. 4 is a schematic view of the brake unit for a second embodiment of the present invention.

Please refer to FIGS. 1A, 1B and 4, which show another embodiment similar to the above embodiment. Some features of the instant embodiment are identical to the above embodiment, such that the identical features are not disclosed again. Specifically, the brake unit 17' of the instant embodiment as shown in FIG. 4 may further omit the cap. The tapped holes 1772 may be formed directly on the right side portion of the resisting block 175. The screws 1773 are used to secure the locking pad 178 with the resisting block 175. The resisting block 175 can be made of resilient material such as rubber or soft plastic. The resisting block 175 may also be made of non-flexible material. For this configuration, a rubber or soft plastic member can be arranged on the left side portion of the resisting block 175 to achieve the same performance.

In more detail, the brake unit 17' is correspondingly arranged between the mounting unit 16 and the supporting unit 15. The brake unit 17' has a bracket 174 firmly fixed on the mounting unit 16, a resisting block 175 housed in the bracket 174, and a locking pad 178 fastened to the resisting block 175 via the bracket 174.

The bracket 174 has a slanting surface 1741, a first surface 1742, and a second surface 1743 substantially parallel to the first surface 1742. The slanting surface 1741 has a first end (i.e., the bottom end of the slanting surface 1741 as shown in FIG. 4) and an opposite second end (i.e., the top end of the slanting surface 1741 as shown in FIG. 4). The distance between the first end of the slanting surface 1741 and the corresponding contact wall 156 is greater than the distance between the second end of the slanting surface 1741 and the corresponding contact wall 156. The first end of the slanting surface 1741 is connected to the first surface 1742, and the second end of the slanting surface 1741 is connected to the second surface 1743. The distance between the slanting surface 1741 and the corresponding contact wall 156 gradually decreases in the first direction D1.

Moreover, the bracket 174 has a thru-slot 176 passing there-through. The locking pad 178 is disposed at one end of the thru-slot 176, and the slanting surface 1741 is connected to and adjacent to another end of the thru-slot 176. A guiding plane 1745 is formed on the interior surface of the thru-slot 176, the guiding plane 1745 is longer than the locking pad 178 along the first direction D1, and one side of the locking pad 178 is movable along the guiding plane 1745.

Moreover, the resisting block 175 is movably arranged between the first surface 1742 and the second surface 1743, and the resisting block 175 is clamped between the slanting surface 1741 and the contact wall 156 to establish varying frictional contact with the contact wall 156 and the slanting surface 1741. The resisting block 175 has a main body 1752 and a ridge 1751 integrally formed on the main body 1752. The main body 1752 has a mating surface 1753 and a frictional surface 1754 arranged on an opposite side of the mating surface 1753. The mating surface 1753 abuts against the slanting surface 1741, and the frictional surface 1753 abuts against the contact wall 156. The resisting block 175 is clamped between the slanting surface 1741 and the contact wall 156, so that the mating surface 1753 of the instant embodiment permanently contacts the slanting surface 1741, and the frictional surface 1754 of the instant embodiment permanently contacts the contact wall 156. The ridge 1751 protrudes from the mating surface 1753. The ridge 1751 is movably inserted into the thru-slot 176 and fastened to the locking pad 178.

The resisting block 175 of the instant embodiment is movable between a first position (similar to FIG. 3D) and a second position (similar to FIG. 3C) with respect to the slanting surface 1741. The detail description is disclosed as follows.

When the resisting block 175 is at the first position (similar to FIG. 3D), the resisting block 175 is disposed on the first surface 1742 of the bracket 174, the brake unit 17' generates a lower frictional threshold force between the resisting block 175 and the contact wall 156.

And then, when the mounting unit 16 moves in the second direction D2, the resisting block 175 is relatively moving to the second position (similar to FIGS. 3D through 3C) in the first direction D1, thereby gradually increasing a frictional force existed between the resisting block 175 and the contact wall 156 based on the gradually decreased distance between the slanting surface 1741 and the corresponding contact wall 156.

When the resisting block 175 is at the second position (similar to FIG. 3C), the resisting block 175 is abutted on the second surface 1743 of the bracket 174, the resisting block 175 is squeezed and compressed by the slanting surface 1741 and the contact wall 156 for resiliently deforming the resisting block 175 to cause the brake unit 17' to generate an upper frictional threshold force between the resisting block 175 and the contact wall 156, and the upper frictional threshold force is greater than the lower frictional threshold force. The deformation of the resisting block 175 in the second position is greater than the deformation in the first position.

And then, when the mounting unit 16 moves in the first direction D1, the resisting block 175 is relatively moving to the first position (similar to FIGS. 3C through 3D) in the second direction D2, thereby gradually decreasing a frictional force existed between the resisting block 175 and the contact wall 156 based on the gradually increased distance between the slanting surface 1741 and the corresponding contact wall 156.

Figure 5A:
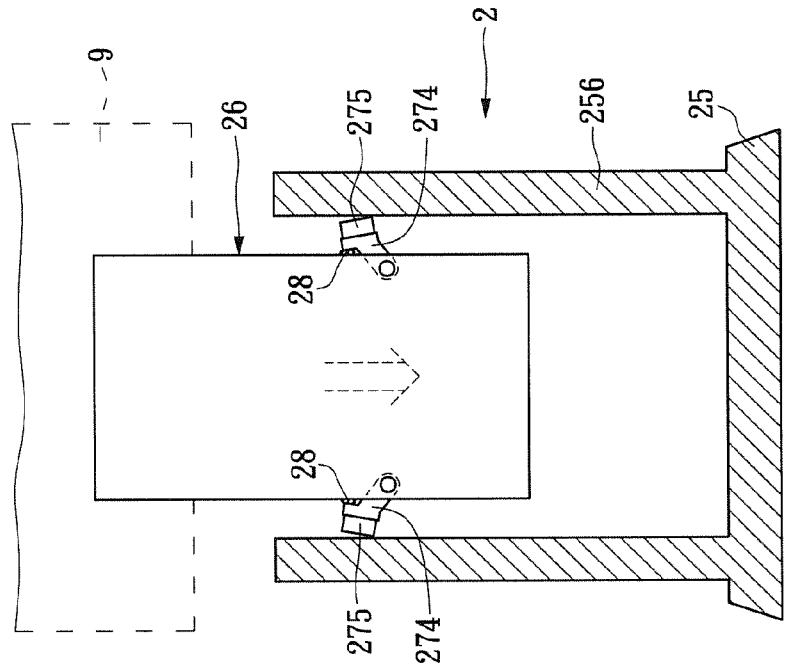
FIG. 5A is a sectional view of the monitor stand according to the second embodiment when the mounting unit is moving upward.
Figure 5B:
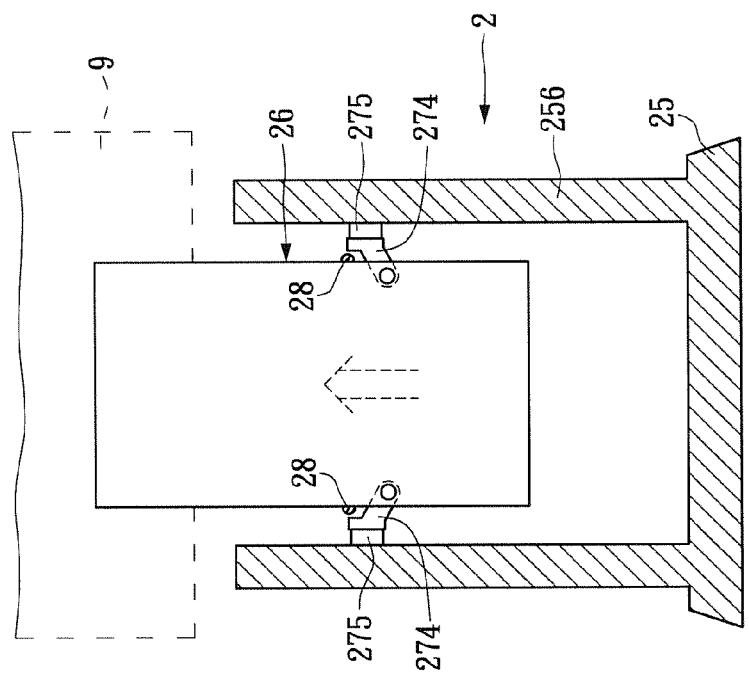
FIG. 5B is a sectional view of the monitor stand according to the second embodiment when the mounting unit is moving downward.

Please refer to FIGS. 5A and 5B for a second embodiment of the present invention. FIG. 5A is sectional view of the monitor stand when the mounting unit is moving upward. Whereas FIG. 5B is sectional view of the monitor stand when the mounting unit is moving downward. For this embodiment, a monitor stand 2 is utilized for supporting a screen unit 9. The monitor stand 2 comprises a supporting unit 25, a mounting unit 26, a pair of contact walls 256, and a pair of brake units (not labeled). Technical features that are similar to the previous embodiment are not discussed again herein. The two brake units of the instant embodiment include two brackets 274, two stoppers 28, and two resisting blocks 275. The brackets 274 are pivotally disposed on the respective side portions of the mounting unit 26, and the resisting blocks 275 are disposed on the surfaces of respective brackets 274 adjacent to the contact wall 256. The stoppers 28 are disposed on opposite side portions of the mounting unit 26 and above the pivoting position of the brackets 274.

As shown in FIG. 5A, when the mounting unit 26 is idle with respect to the contact walls 256 (i.e. the screen unit 9 is idle), each of the resisting blocks 275 touches the corresponding contact wall 256 parallely to generate a frictional force to counter the supported weight in achieving an equilibrium. Meanwhile, the resisting blocks 275 do not touch the stoppers 28. At this instant, the contact area of the resisting block 275 with the contact wall 256 is maximum, which generates the upper frictional threshold force. This condition is the same as the second position of the brake unit 17 described in the first embodiment.

The pivoting location for each of the brackets 274 is arranged toward the lower portion of the mounting unit 26. When the screen unit 9 is moved upward, the resisting blocks 275 naturally maintain surface-to-surface contact with the contact walls 256. Hence, the force that needs to be overcome is the upper frictional threshold force.

When moving the screen unit 9 downward (i.e. the mounting unit 26 moves downward with respect to the contact walls 256), the brackets 274 and the resisting blocks 275 are rotated upward. Eventually, the brackets 274 are stopped from rotating by abutting to the stoppers 28. At this time, the resisting block 275 contacts the contact walls 256 obliquely (as shown in FIG. 5B). At such moment, the contact area between each of the resisting block 275 and the corresponding contact wall 256 is minimum, which generates the lower frictional threshold force that must be overcame to move the screen unit 9 downward. This condition is the same as the first embodiment when the brake units 17 are arranged at the first position. In other words, the instant embodiment is a reversed version of the first embodiment.

Alternatively, the stoppers 28 may also be omitted. Whereas the side portions of the mounting unit 26 can provide direct blocking effect to prevent the resisting blocks 275 from completely disengaging the contact walls 256, thus ensuring the monitor stand 2 does not loose the braking effect.

Figure 6A:
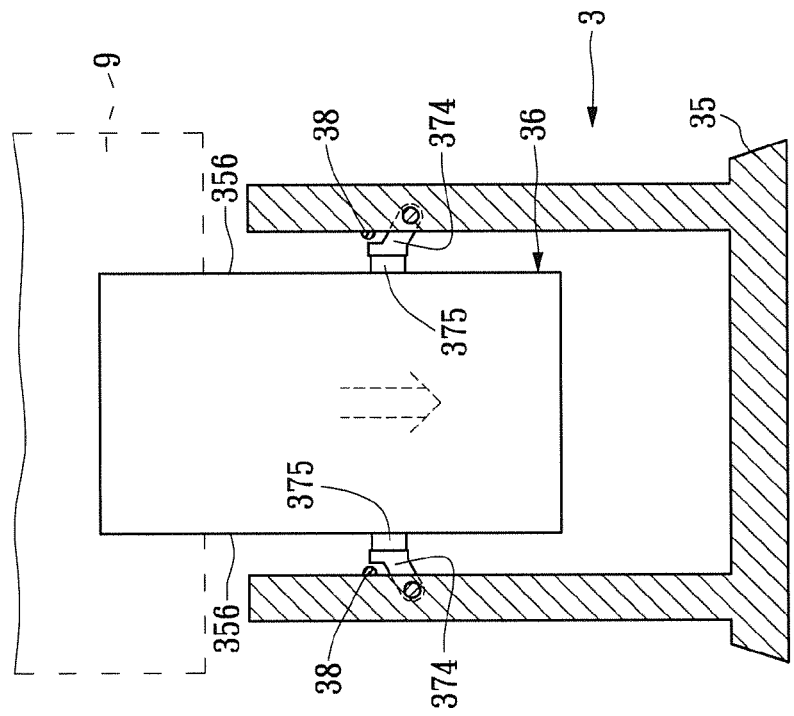
FIG. 6A is a sectional view of the monitor stand according to a third embodiment when the mounting unit is moving upward.
Figure 6B:
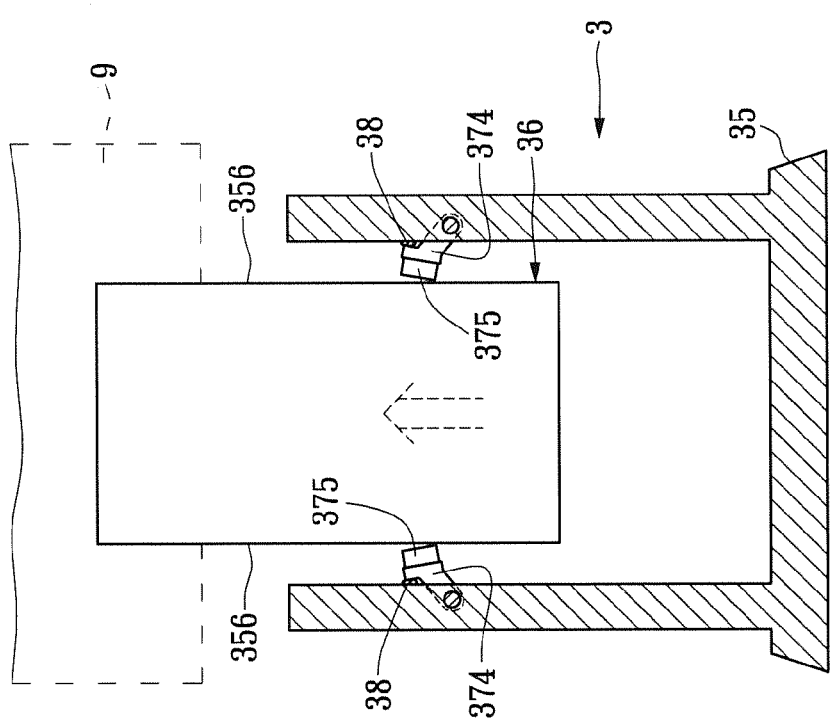
FIG. 6B is a sectional view of the monitor stand according to the third embodiment when the mounting unit is moving downward.

Please refer to FIGS. 6A and 6B. FIG. 6A is a sectional view of a monitor stand for a third embodiment when the mounting unit is moving upward. FIG. 6B is a sectional view of the monitor stand of the same embodiment when the mounting unit is moving downward. The monitor stand 3 of the third embodiment of the present invention is utilized for supporting the screen unit 9. The monitor stand 3 comprises a supporting unit 35, a mounting unit 36, two contact walls 356, two stoppers 38, and two brake units (not labeled). This embodiment is similar to the second embodiment, with the main difference being the brackets 374 of the third embodiment are pivotally arranged on the inner walls (not labeled) of the supporting unit 35. The two contact walls 356 are formed on respective side portions of the mounting unit 36. In other words, the positions of the brake units and the contact walls 356 are reversed, to achieve the same effect as the second embodiment. As with the second embodiment, the stoppers 38 may also be omitted.

Figure 7A:
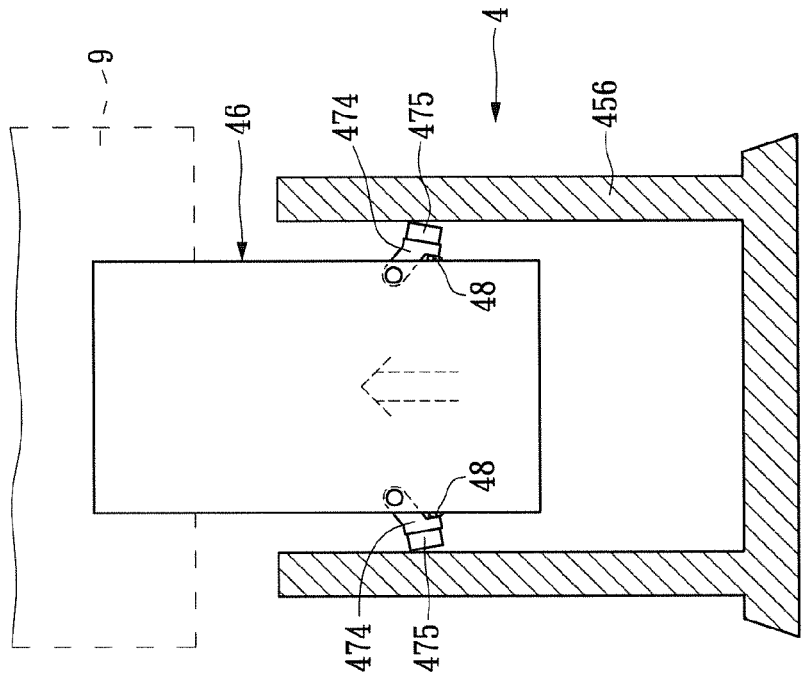
FIG. 7A is a sectional view of monitor stand according to a fourth embodiment when the mounting unit is moving upward.
Figure 7B:
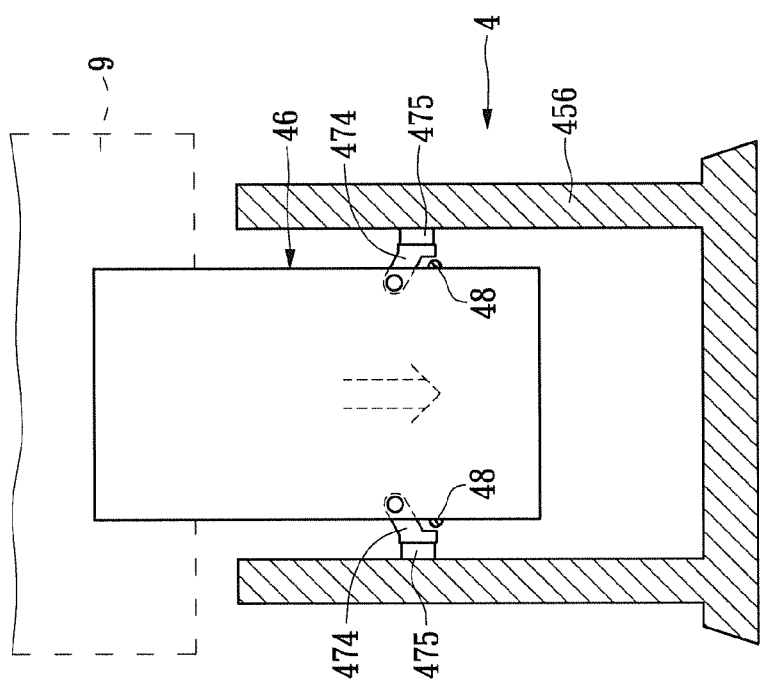
FIG. 7B is a sectional view of the monitor stand according to the fourth embodiment when the mounting unit is moving downward.

Please refer to FIGS. 7A and 7B, which show the monitor stand 4 for a fourth embodiment of the present invention. The monitor stand 4 is structurally similar to the monitor stand 2 of FIGS. 5A and 5B. The main difference is that the brackets 474 are pivotally arranged on the mounting unit 46, with each of the pivoting locations being above the main body of the corresponding bracket 474, while the stoppers 48 are arranged below the pivoting positions of the brackets 474. When the screen unit 9 is being moved downward, the resisting blocks 475 would naturally contact the contact walls 456 parallely (second position). Therefore, the force that needs to be overcame is the upper frictional threshold force. When the screen unit 9 is being moved upward, the brackets 474 and the resisting blocks 475 would rotate downward. Eventually, the brackets 474 are stopped from rotating by the stoppers 48. The resisting blocks 475 contacts the contact walls 456 obliquely (first position). As shown in FIG. 7B, the force that needs to be overcame at this condition is the lower frictional threshold force.

In summary, the monitor stand of present invention utilizes the friction generated between the resisting block 175, 275, 375, 475 and the contact wall 156, 256, 356, 456, respectively, so as to secure the screen unit 9 at any vertical position. Also, the elastic components and springs are eliminated to prevent inducing accidental injury to the user. Moreover, the lower frictional threshold force and the upper frictional threshold force may be generated by changing the position of the resisting block 175, 275, 375, 475 between the first position and the second position, respectively.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

What is claimed is:

1. A monitor stand for supporting a screen unit, comprising:
   a supporting unit having a contact wall;
   a mounting unit for connecting with the screen unit, wherein the mounting unit is movable against the supporting unit along a first direction or a second direction, wherein the first direction means moving the mounting unit up with respect to the supporting unit, and the second direction means moving the mounting unit down with respect to the supporting unit, and wherein the contact wall being substantially parallel to the first direction; and
   at least one brake unit correspondingly arranged between the mounting unit and the supporting unit, the brake unit comprising:
      a bracket firmly fixed on the mounting unit, wherein the bracket has a slanting surface, a first surface, and a second surface,
      wherein the slanting surface has a first end and an opposite second end, the distance between the first end of the slanting surface and the corresponding contact wall is greater than the distance between the second end of the slanting surface and the corresponding contact wall, wherein the first end of the slanting surface is connected to the first surface, and the second end of the slanting surface is connected to the second surface,
      wherein the distance between the slanting surface and the corresponding contact wall gradually decreases in the first direction; and
      a resisting block housed in the bracket and movably arranged between the first and the second surfaces of the bracket, wherein the resisting block has a mating surface and a frictional surface arranged at an opposite side of the mating surface, the mating surface and the frictional surface are respectively and permanently contacting the slanting surface and the contact wall, and the resisting block is clamped between the slanting surface and the contact wall to establish varying frictional contact with the contact wall and the slanting surface,
      wherein the resisting block is movable between a first position and a second position with respect to the slanting surface,
      wherein when the resisting block is at the first position, the resisting block is disposed on the first surface of the bracket, the brake unit generates a lower frictional threshold force between the resisting block and the contact wall,
      wherein when the mounting unit moves in the second direction, the resisting block is relatively moving to the second position in the first direction, thereby gradually increasing a frictional force existed between the resisting block and the contact wall based on the gradually decreased distance between the slanting surface and the corresponding contact wall,
      wherein when the resisting block is at the second position, the resisting block is abutted on the second surface of the bracket, the resisting block is squeezed and compressed by the slanting surface and the contact wall for resiliently deforming the resisting block to cause the brake unit to generate an upper frictional threshold force between the resisting block and the contact wall, and the upper frictional threshold force is greater than the lower frictional threshold force, and
      wherein when the mounting unit moves in the first direction, the resisting block is relatively moving to the first position in the second direction, thereby gradually decreasing a frictional force existed between the resisting block and the contact wall based on the gradually increased distance between the slanting surface and the corresponding contact wall,
wherein the deformation of the resisting block in the second position is greater than the deformation in the first position.

2. The monitor stand as claim 1, wherein the bracket has a thru-slot passing there-through, the brake unit further contains a locking pad disposed at one end of the thru-slot, the slanting surface connected to and adjacent to another end of the thru-slot, the locking pad and the resisting block been fastened.

3. The monitor stand as claim 2, wherein a guiding plane is formed on the interior surface of the thru-slot, the guiding plane is longer than the locking pad along the first direction, and wherein one side of the locking pad is movable along the guiding plane.

4. The monitor stand as claim 2, wherein the resisting block has a main body and a ridge integrally formed on the main body, the ridge protrudes from the mating surface, and the ridge is movably inserted into the thru-slot and fastened to the locking pad.

5. The monitor stand as claim 1, wherein the first surface of the bracket is substantially parallel to the second surface of the bracket.

* * * * *